(12) United States Patent
Strutt et al.

(10) Patent No.: US 8,184,610 B2
(45) Date of Patent: May 22, 2012

(54) METHOD FOR ADAPTIVE BEACONING

(75) Inventors: Guenael T. Strutt, Sanford, FL (US);
Charles R. Barker, Orlando, FL (US);
Keith J. Goldberg, Casselberry, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 729 days.

(21) Appl. No.: 12/327,481

(22) Filed: Dec. 3, 2008

(65) Prior Publication Data

US 2010/0135267 A1 Jun. 3, 2010

(51) Int. Cl.
*H04B 7/212* (2006.01)
(52) U.S. Cl. ........................ 370/347; 370/337
(58) Field of Classification Search .............. 370/328, 370/337, 338, 347, 401; 375/131, 132, 256; 709/248
See application file for complete search history.

(56) References Cited

U.S. PATENT DOCUMENTS

| | | | |
|---|---|---|---|
| 6,512,935 B1 | 1/2003 | Redi | |
| 6,751,248 B1 * | 6/2004 | Tan | 375/132 |
| 7,222,175 B2 | 5/2007 | Knauerhase et al. | |
| 7,333,460 B2 | 2/2008 | Vaisanen et al. | |
| 7,706,822 B2 * | 4/2010 | Emeott et al. | 455/502 |
| 2003/0016732 A1 | 1/2003 | Miklos et al. | |
| 2005/0025092 A1 * | 2/2005 | Morioka et al. | 370/328 |
| 2005/0249173 A1 | 11/2005 | Salokannel et al. | |
| 2006/0271114 A1 * | 11/2006 | Voelkel | 607/2 |
| 2008/0107157 A1 | 5/2008 | De Ruijter | |

FOREIGN PATENT DOCUMENTS

| | | |
|---|---|---|
| WO | 2007052709 A1 | 5/2007 |
| WO | 2007096823 A1 | 8/2007 |

OTHER PUBLICATIONS

Madasser IQBAL et al—"Load-ADAPTIV E BEAC on EXC Hange Rate in Self Configuring Ubiquitous Networks"—IEEE 2005—pp. 195-199.
IEEE 802.11, "DCF," Part 11: Wireless LAN Medium Access Control (MAC) and Physical Layer (PHY) Specifications; Section 9.2, 1999, pp. 72-86.
Corresponding PCT Application No. PCT/US2009/063955—International Search Report with Written Opinion mailed Jun. 14, 2010.

* cited by examiner

*Primary Examiner* — Andrew Lai
(74) *Attorney, Agent, or Firm* — Randi L. Karpinia

(57) ABSTRACT

A method of adaptive beaconing includes operating a node within an ad hoc wireless communication network to calculate a probability P for an interval of time I; transmit a beacon when a uniformly distributed random number is less than the probability P; and wait for the interval of time "I" and repeat the calculate, transmit, and waiting operations when the uniformly distributed random number is greater than the probability P.

5 Claims, 3 Drawing Sheets

METHOD FOR ADAPTIVE BEACONING

FIELD OF THE DISCLOSURE

The present disclosure relates generally to wireless communication networks and more particularly to beaconing in ad hoc wireless communication networks.

BACKGROUND

Wireless communications protocols such as IEEE 802.11 (For any IEEE standards recited herein, see: http://standards.ieee.org/getieee802/index.html or contact the IEEE at IEEE, 445 Hoes Lane, PO Box 1331, Piscataway, N.J. 08855-1331, USA.) include management and control frames that support data transfer. The beacon frame, which is a type of management frame, enables stations to establish and maintain communications in an orderly fashion.

A typical beacon frame includes a common frame header and a cyclic redundancy checking (CRC) field. The header typically includes source and destination Medium Access Control (MAC) addresses as well as other information regarding the communications process. The destination address is set to the broadcast Medium Access Control (MAC) address. This forces all other stations on the applicable channel to receive and process each beacon frame. The CRC field provides error detection capability.

The beacon's frame body resides between the header and the CRC field and includes information about the beaconing device, such as the beaconing device's Media Access Control (MAC) address, the location of the beaconing device, the channels or sub-channels that are being used by the beaconing device or by the communication device associated with the beaconing device, the length of time that these channels will be used, the priority of the beaconing device, and the like. This information can be used for various purposes such as synchronization, checking signal strength of the beaconing device and determining proximity to the licensed device.

In infrastructure networks, access points periodically send beacons. In ad hoc networks, one or more of the peer stations assumes the responsibility for sending the beacon. After receiving a beacon frame, each station (also known as node, communication device, mobile node, or mesh node) waits for the beacon interval and then sends a beacon if no other station does so after a random time delay. This ensures that at least one station will send a beacon, and the random delay rotates the responsibility for sending beacons.

By increasing the beacon interval, the number of beacons and associated overhead is reduced, but that will likely delay the association and roaming process because stations scanning for available access points or neighboring stations may miss the beacons. Decreasing the beacon interval increases the rate of beacons. This will make the association and roaming process very responsive; however, the network will incur additional overhead and throughput will be reduced. In addition, stations using power save mode will need to consume more power because they'll need to awaken more often, which reduces power saving mode benefits.

There are no reservations for sending beacons, and they are commonly sent using the 802.11 carrier sense multiple access/collision avoidance (CSMA/CA) algorithm. If another station is sending a frame when the beacon is to be sent, then the sending station must wait. As a result, the actual time between beacons may be longer than the beacon interval. Stations, however, compensate for this inaccuracy by utilizing the timestamp found within the beacon.

When a beacon is found, the receiving station learns a great deal about that particular network. This enables a ranking of access points and other neighboring nodes based on the received signal strength of the beacon, along with capability information regarding the network. The station can then associate with the most preferable access point or other network device, for example.

After association, the station continues to scan for other beacons in case the signal from the currently-associated neighboring device become too weak to maintain communications. As the station receives beacons from the associated device, the station updates its local clock to maintain timing synchronization with the device and other stations. In addition, the station will abide by any other changes, such as data rate, that the frame body of the beacon indicates.

In a typical beaconing system, every device sends a beacon at a predetermined interval of time. This means there is an upper limit on the practical size/density of a network. Dense networks tend to have too much signaling overhead—including beacons. Adjusting the beacon rate based on density penalizes nodes that are in the center of the network, independently of actual airtime usage. Accordingly, there is a need for a method for adaptive beaconing.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
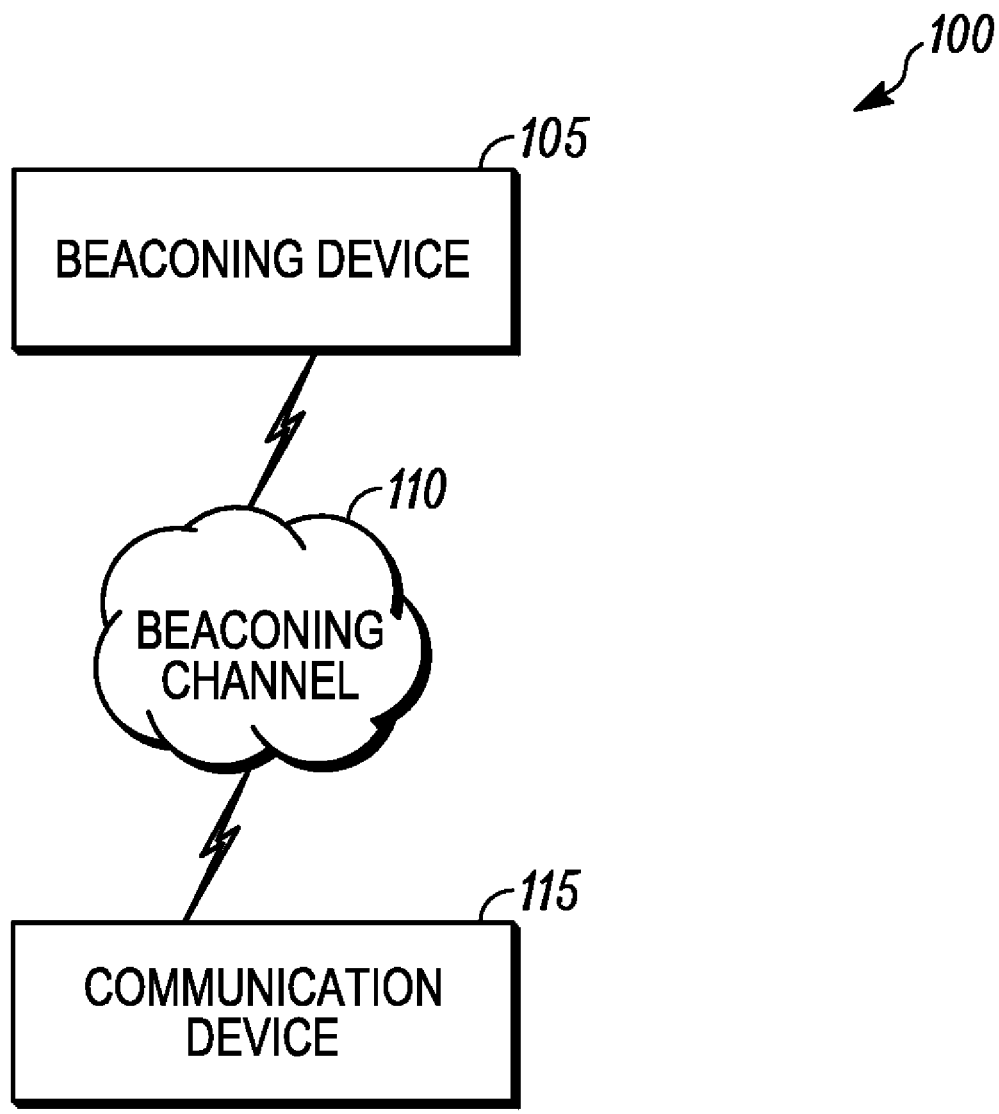
FIG. 1 is a block diagram illustrating an example of a wireless communication system for implementation of the method of adaptive beaconing in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Beaconing systems benefit from shorter beaconing intervals because information is refreshed more often. Ideally, a system would allocate a portion of its overall bandwidth to beaconing. This can be achieved by beaconing at irregular time intervals, yet insure that each device has the same beaconing probability. In this way, the system takes advantage of low-density scenarios while constraining the self-inflicted interference in high-density scenarios.

The present invention provides for a method of adaptive beaconing includes operating a node within an ad hoc wireless communication network to calculate a probability P for an interval of time J; transmit a beacon when a uniformly distributed random number is less than the probability P; and wait for the interval of time "I" and repeat the calculate, transmit, and waiting operations when the uniformly distributed random number is greater than the probability P.

FIG. 1 is a block diagram illustrating an example of a wireless communication system 100 for implementation of the method of adaptive beaconing of embodiments. The wireless communication system 100, for example, can be a mesh enabled architecture (MEA) network or an 802.11 network (i.e. 802.11a, 802.11b, 802.11g, or 802.11s). It will be appreciated by those of ordinary skill in the art that the communication network 100 in accordance with the present invention can alternatively comprise any packetized communication network where packets are forwarded across multiple wireless hops. For example, the communication network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop.

The wireless communication system 100 includes at least one beaconing device 105, at least one beaconing channel 110 and at least one communication device 115. Those skilled in the art will appreciate that even though FIG. 1 depicts one beaconing device, one communication device and one beaconing channel, any number of beaconing devices, beaconing channels and communication devices may be present in the wireless communication system 100 and all such embodiments are within the scope of the present invention.

In one embodiment, the beaconing device 105 may be a stand alone device associated with one or more communication devices. In another embodiment, the beaconing device 105 may reside on a communication device. The communication device that is associated with the beaconing device 105 may be using a channel for communication in the wireless communication system 100. In another embodiment, to prevent other communication devices from using the channel used by the communication device that is associated with the beaconing device 105, the beaconing device 105 may send one or more sub-frames of a beacon signal over the beaconing channel 110. Further, the beaconing channel 110 can be reserved for transmitting beacon signals in the wireless communication system 100. Alternatively, the beaconing channel 110 may be used for transmitting beacon signals as well as for communication. For instance, a sub-channel of the beaconing channel 110 may be used for sending beacon signals and another sub-channel of the beaconing channel 110 may be used for communication.

The communication device associated with beaconing device 105 and the communication device 115 may be devices such as, but not limited to, a wireless microphone, a mobile device such as a mobile phone, public-safety radio, or other wireless equipment operating using, for instance, Wi-Fi, WiMax (Worldwide Interoperability for Microwave Access), IEEE 802.11 standards, and the like.

A communication device may be using a channel for communication in the wireless communication system 100 and therefore, may gain the assistance of the beaconing device 105 to send beacon signals over the beaconing channel 110. Such a communication device is said to be "associated" with beaconing device 105. As mentioned earlier, it should be noted that the beaconing device 105 and the communication device associated with the beaconing device 105 may be embodied as either separate physical devices or as functions included within the same physical device, such as part of a single chassis, contained within a single circuit board, or part of a single integrated circuit.

Further, the communication device 115 is a device which is capable of identifying one or more channels suitable for communication in the wireless communication system 100. The communication device 115 uses the results of its sensing activities to decide which channels can be used for communication. Those skilled in the art shall appreciate that the communication device 115 may be a licensed device or unlicensed device. Also, the communication device 115 may consist of a sensing module, which is used for sensing beacon signals, and a communication module, that is used for communications. The sensing module and the communication module may be embodied as either separate physical devices or as functions included within the same physical device, such as part of a single chassis, contained within a single circuit board, or part of a single integrated circuit.

Figure 2:
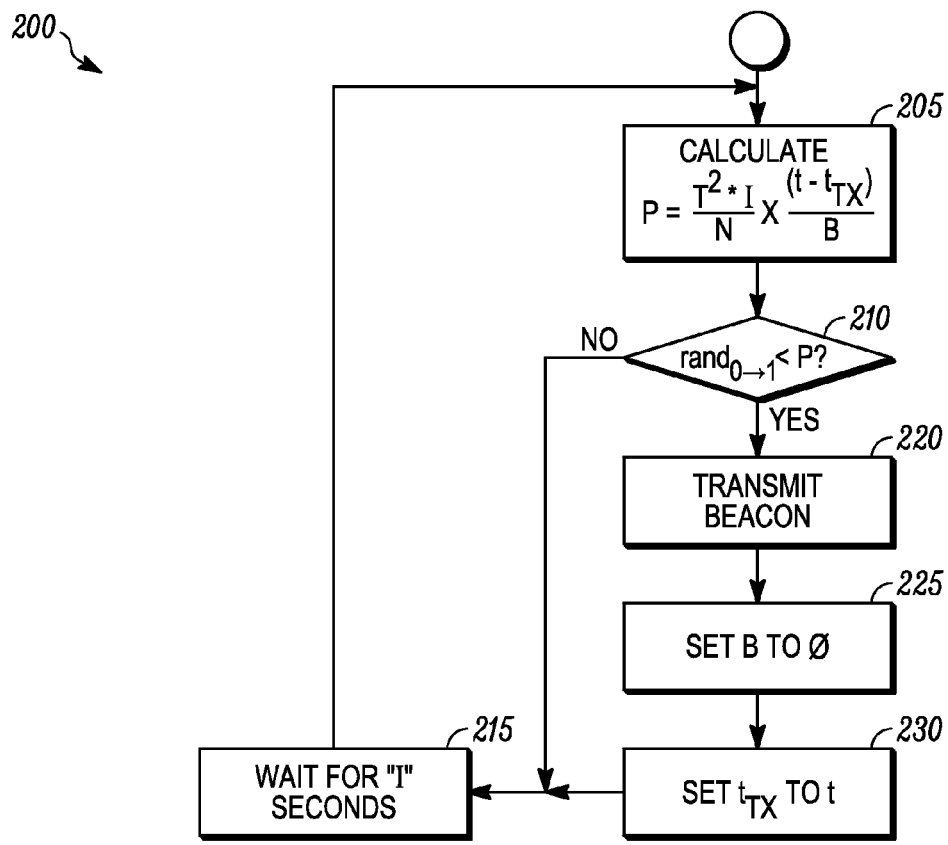
FIGS. 2 and 3 are flowcharts of a method of adaptive beaconing in accordance with some embodiments.

FIG. 2 is a flowchart illustrating a method of adaptive beaconing 200 in accordance with some embodiments of the present invention. Specifically, FIG. 2 illustrates the operation of a communication device for transmitting beacons within a wireless communication system (such as the wireless communication system 100) in accordance with some embodiments. As illustrated in FIG. 2, the operation begins with Step 205 in which, for an interval of time I, a probability P, is calculated as per the following equation:

$$P = \frac{T^2 \cdot I}{N} \cdot \frac{t - t_{TX}}{B}$$

Where:
N is the measured number of neighbors, a long term measure designed to capture all beaconing devices
T is the target rate of beacons (in units of time$^{-1}$)
t is the timestamp of the dice roll (generation of a random number) (in units of time)
$t_{TX}$ is the time stamp at which the last beacon was sent (in units of time)
B is the number of beacons received since the last beacon was sent Next, in Step 210, it is determined whether a uniformly distributed random number between 0 and 1 (i.e. a number generated pursuant to a predetermined random number generation algorithm) is less than P as calculated in Step 205. When the random number is greater than P (i.e. not less than P), then in Step 215 the device waits for "I" seconds (i.e. a predetermined interval "I"), and then cycles back to Step 205. It will be appreciated therefore that the device does not send a beacon.

Referring back to Step 210, when the random number is less than the calculated P, then in Step 220 a beacon is transmitted. Next, in Step 225, B is reset to 0. Next, in Step 230 $t_{TX}$ is set to t. Next, in Step 215 the device waits for "I" seconds (i.e. a predetermined interval "I"), and then cycles back to Step 205.

Figure 3:
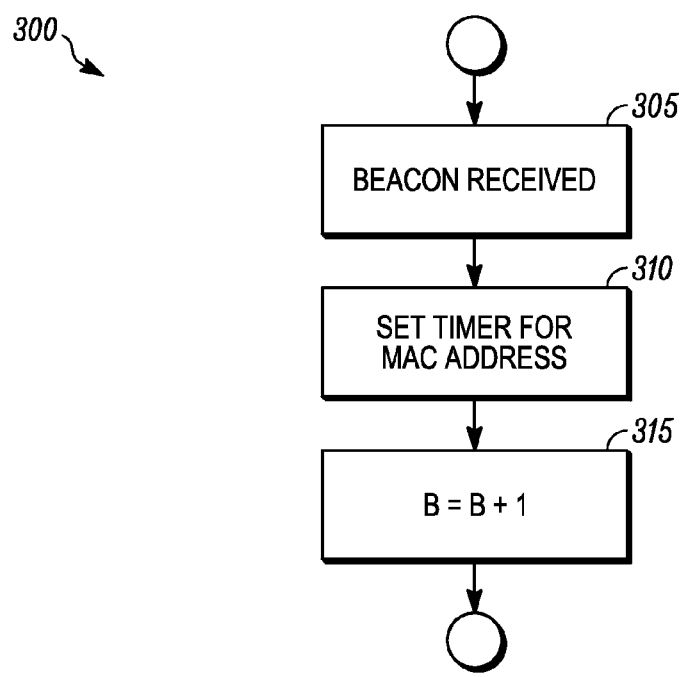

Referring next to FIG. 3, a method of operation 300 of a communication device when receiving a beacon is illustrated in accordance with some embodiments. As illustrated in FIG. 3, the operation begins with Step 305 in which a beacon is received. Next, in Step 310, a timer is set for the associated MAC address of the received beacon. The timer is used for the purpose of estimating the number of neighbors N, and is not related to the method of adaptive beaconing 200. Next, in Step 315, B is incremented to B=B+1.

Figure 4:
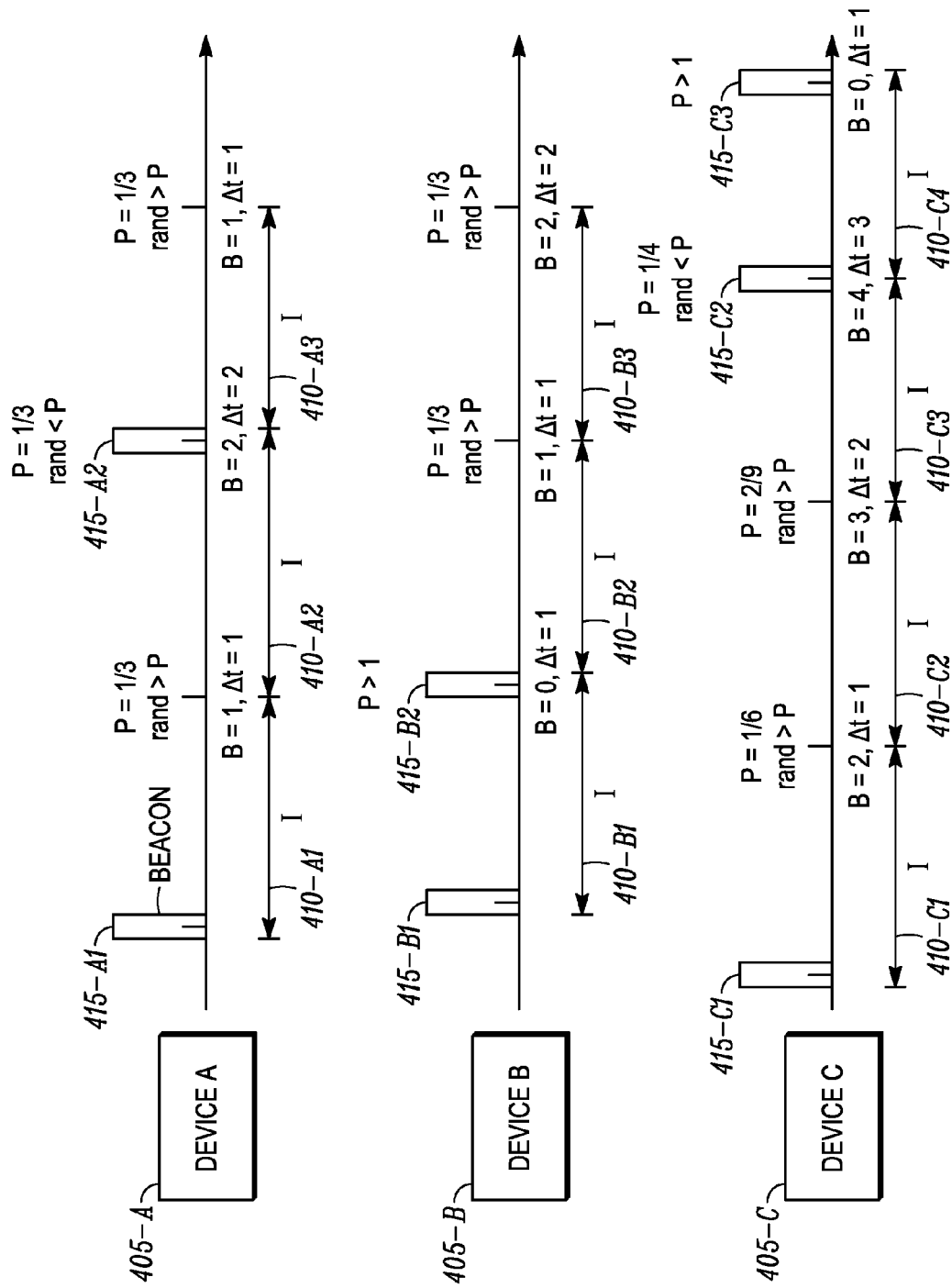
FIG. 4 illustrates an example of the implementation of the method for adaptive beaconing within a wireless communication network in accordance with some embodiments.

FIG. 4 illustrates an example of the implementation of the method for adaptive beaconing including the operation of FIGS. 2 and 3 described previously herein within a wireless communication network in accordance with some embodiments. Specifically, FIG. 4 illustrates the operation of three communication devices, Device A 405-A, Device B 405-B, and Device C 405-C. Those skilled in the art will appreciate that even though FIG. 4 depicts three communication devices, any number of communication devices may be present in the wireless communication system and operating according to the embodiments of the present invention.

As illustrated in FIG. 4, Device A 405-A sends a beacon 415-A1. Next, at an interval I 410-A1, where I is the interval in which Device A 405-A can send beacons, (For example purposes only, I is equal to one (1) second in the operation described for FIG. 4.) Device A 405-A calculates P=⅓, using B=1 and $\Delta t$=1, (where $\Delta t$ denotes t-$t_{TX}$). (note that for purposes of this example, the target rate T is one (1) second.) Since a random number is greater than the calculated P, no beacon is sent. At the next interval I 410-A2, Device A 405-A calculates P=⅓, using B=2 and $\Delta t$=2(where $\Delta t$ denotes t-$t_{TX}$). Since the random number is less than the calculated P, a beacon 415-A2 is transmitted. At a next interval I 410-A3, Device A 405-A calculates P=⅓, using B=1 and $\Delta t$=/(where $\Delta t$ denotes t-$t_{TX}$). Since the random number is more than the calculated P, no beacon is sent. For the example operation of Device A 405-A, the interval I is illustrated and presumed equal throughout the time period, however, it will be appreciated by those of ordinary skill in the art that the interval I for each of the devices can alternatively be a varying interval.

Turning now to Device B 405-B, Device B 405-B sends a beacon 415-B1. Next, at an Interval I 410-B1, Device B 405-B calculates P>1, using B=0 and $\Delta t$=1 (where $\Delta t$ denotes t-$t_{TX}$. When P>1, a beacon 415-B2 is therefore transmitted. Next, at an Interval I 410-B2, Device B 405-B calculates P=⅓, using B=1 and $\Delta t$=1 (where $\Delta t$ denotes t-$t_{TX}$). Since P is less than the random number, no beacon is sent. Next, at an interval I 410-B3, Device B 405-B calculates P=⅓ using B=2 and $\Delta t$=2(where $\Delta t$ denotes t-$t_{TX}$). Since P is once again less than the random number, no beacon is sent.

Turning now to Device C 405-C, a beacon 415-C1 is sent. After an interval I 410-C1, Device C 405-C calculates P=⅙ using B=2 and $\Delta t$=1 (where $\Delta t$ denotes t-$t_{TX}$). Since P is less than the random number, no beacon is sent. Next, after an interval I 410-C2, Device C 405-C calculates P=⅔ using B=3 and $\Delta t$=2(where $\Delta t$ denotes t-$t_{TX}$). Since P is less than the random number, no beacon is sent. Next, at an interval I 410-C3, Device C 405-C calculates P=¼ using B=4 and $\Delta t$=3(where $\Delta t$ denotes t-$t_{TXX}$). Since P is greater than the random number, a beacon 415-C2 is transmitted. Next after an interval I 410-C4, Device C 405-C calculate P>1 using B=0 and $\Delta t$=1 (where $\Delta t$ denotes t-$t_{TX}$). Since P>1, a beacon is transmitted.

As the example scenario of FIG. 4 illustrates, the method for adaptive beaconing of the present invention requires no communication or coordination between nodes (communication devices). Further, the method is probabilistic—it does not set an interval. It sets a probability that is adjusted every time a beacon is sent or received. Further, the method allows for varying beacon rates (such as high rate for "backbone" nodes and low rate for "leaf" nodes).

It will be appreciated by those of ordinary skill in the art that MACs do not scale to infinity. There is always a point where a network becomes unable to cope with the traffic load. When traffic is interrupted, the network should return to a normal state. However, if the passive traffic is too high or the MAC reacts to congestion by sending more traffic over the air, the normal state may not be reached again.

The embodiments of the method for adaptive beaconing herein is a beneficial measure to prevent network devices from generating enough self-inflicted interference that they cannot return to their original quiescent state. It proactively sets the beaconing rate to a target level that is easy to understand by a network operator (for example, "50 beacons per second").

It will be appreciated by those of ordinary skill in the art that many conventional self-regulating algorithms suffer from unfairness. For example, when certain devices measure congestion and back off, they let other devices that (as a consequence) measure less congestion and starts transmitting more often, exacerbating the problem. Oscillations are also common.

When implementing the embodiments of the present invention, scalability is no longer driven by the number of beacons that a system can sustain (since it is fixed), but by the interval of time that a system can sustain itself without receiving a beacon.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of adaptive beaconing comprising:
    operating a node within an ad hoc wireless communication network to:
        calculate a probability P for an interval of time I;
        transmit a beacon when a uniformly distributed random number is less than the probability P; and
        wait for the interval of time "I" and repeat the calculate, transmit, and waiting operations when the uniformly distributed random number is greater than the probability P.

2. The method of claim 1 wherein the probability P is calculated using a measure of a number of beacons received since a last beacon was sent, a measure of a number of neighboring beaconing nodes, a measure of a time elapsed since the last beacon was sent, and a target beaconing rate.

3. The method of claim 2, further comprising after transmitting the beacon, operating the node to:
    reset B to 0, where B is the number of beacons received since the last beacon was sent;
    set $t_{TX}$ to t, where $t_{TX}$ is the time stamp at which the last beacon was sent;
    wait for the interval of time "I"; and
    repeat the calculate, transmit, and waiting operations.

4. The method of claim 1, wherein the uniformly distributed random number is a number generated pursuant to a predetermined random number generation algorithm.

5. The method of claim 1, wherein the uniformly distributed random number is a number between 0 and 1.

* * * * *

UNITED STATES PATENT AND TRADEMARK OFFICE
CERTIFICATE OF CORRECTION

| | | |
|---|---|---|
| PATENT NO. | : 8,184,610 B2 | |
| APPLICATION NO. | : 12/327481 | |
| DATED | : May 22, 2012 | |
| INVENTOR(S) | : Strutt et al. | |

It is certified that error appears in the above-identified patent and that said Letters Patent is hereby corrected as shown below:

In the Specifications:

In Column 3, Line 4, delete "time J;" and insert -- time "I" --, therefor.

In Column 5, Line 27, delete "Δt=/ (where" and insert -- Δt=1 (where --, therefor.

In Column 5, Line 37, delete "t-t$_{TX}$." and insert -- t-t$_{TX}$). --, therefor.

Signed and Sealed this
First Day of January, 2013

David J. Kappos
*Director of the United States Patent and Trademark Office*